Nov. 10, 1964 W. G. DARLAND, JR 3,156,588
ECCENTRIC SEPARATOR FOR GALVANIC BATTERY
Filed Oct. 27, 1961

*INVENTOR.*
WILLIAM G. DARLAND, Jr.
BY W. O. Quesenberry
O. Hodges
Paul R. Harder ATTYS.
AGENT.

United States Patent Office 3,156,588
Patented Nov. 10, 1964

3,156,588
ECCENTRIC SEPARATOR FOR GALVANIC
BATTERY
William G. Darland, Jr., Parma, Ohio, assignor, by mesne
assignments, to the United States of America as represented by the Secretary of the Navy
Filed Oct. 27, 1961, Ser. No. 148,297
9 Claims. (Cl. 136—143)

This invention relates generally to a galvanic battery or reserve energizer of the force filled type utilized as a power source in a spinning projectile and more particularly to a new and improved separator for the cells therein.

Heretofore, it has been the general practice in the field of reserve energizers to construct the energizer cells of a plurality of annular steel plates, compatibly coated and separated by a paper separator having an entry-port and a cell channel therein. The annular plates and the separators are alternately stacked, pressed together and incapsulated over the outer and inner surfaces except for a small area along the entry-port which forms a fill channel for the cells. Within the unit, supported above a breaker platform, is a frangible ampule containing a suitable electrolyte. When the projectile is fired the set-back force occurring on the frangible ampule moves the ampule past its support means, allowing it to strike the breaker platform with sufficient force to break the ampule. The electrolyte is released within the ampule cavity, flows along the fill channel and, due to the centrifugal forces acting upon the electrolyte by virtue of the spin of the projectile, the electrolyte is forced through the entry-ports and into the individual cell channels to activate the battery.

If the cells are series connected, it is obvious to one skilled in the art, that intercell communication of the electrolyte at the cut edge of the annular cell plate along the fill channel short circuits the series connected cells and intermittent communication of the electrolyte across this cut edge produces undesired voltage transients which render the battery ineffective with respect to its end use. Prior art devices have utilized a separator having a concentric cell channel and while such a design is satisfactory when the projectile is spinning about the axis of this concentric channel, the design has not proven entirely satisfactory when the spin is off-center. Such an off-center spin results in a non-uniform distribution of the electrolyte within the cell channel thereby reducing the area of the cell plate over which the electrolyte is distributed. Such a reduction in contact area of the electrolyte with the cell plate results in a decrease in the output power of the cell. Further, if the cell is entirely filled by a spin about the axis of the cell channel, and the projectile for some reason later develops a spin about an axis off-center from that of the original spin axis, a portion of the electrolyte tends to retract from the inner edge of the cell channel and, since the remainder of the cell channel is already completely filled with electrolyte, this excess electrolyte is forced back through the entry-port into the cell channel resulting in intercell communication of the electrolyte and producing shorting of the series connected cells or undesired voltage transients as hereinbefore described.

To obviate the foregoing disadvantages, the present invention contemplates a cell channel of eccentric design resulting in complete cells filling by the electrolyte on off-center spins up to 4 mils. Such a design further prevents the intercell communication of the electrolyte resulting from complete filling of the cell on a center-spin and a later development of off-center spin as hereinbefore described.

It is, therefore, an object of this invention to provide a new and improved separator design for use in force filled batteries.

Another object is to provide a cell channel design which is completely filled even on off-center spins.

A further object is to provide a cell channel design which prevents intercell communication of the electrolyte when the device develops an off-center spin after the cell has been completely filled with electrolyte.

Still another object of the device is to provide a galvanic battery of the force filled type which produces a uniform voltage output regardless of eccentric spin.

A still further object is to provide a galvanic battery of the force fill type which does not produce voltage transients upon the occurrence of eccentric spin.

Another object of the invention is to provide a galvanic battery of the force fill type for use in a spinning projectile which is not rendered ineffective with respect to its end uses upon the occurrence of an eccentric spin developed by the projectile.

Other objects and many of the attendant advantages of this invention will be more readily appreciated as the same becomes better understood by reference to the following detailed description when considered in connection with the accompanying drawing in which like reference numerals designate like parts throughout the figures thereof and wherein.

Figure 1:
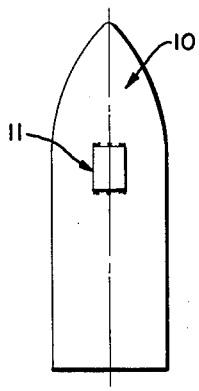
FIG. 1 illustrates a projectile containing a galvanic battery embodying the present invention.

Referring now to FIG. 1 there is illustrated a projectile generally indicated by the numeral 10 within which is contained a galvanic battery or reserve energizer 11 embodying the present invention, the axis of the battery being coincident with the normal spin axis of the projectile. Also contained within the projectile, but not shown, is a proximity fuzing system or any other electrical equipment requiring a power source of the type hereindescribed. It is to be understood that the flight trajectory of the projectile may be at any angle to the horizon and that the spin thereof may be in either direction.

Figure 2:
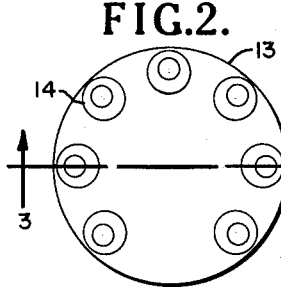
FIG. 2 is a plan view of the galvanic battery embodying the present invention.

FIG. 2 illustrates a plan view of the galvanic battery comprising a battery casing 13 which is castellated to form a plurality of electrical terminal devices 14 to provide for suitable connections to the electrical equipment contained within the projectile. The connector may be of any suitable type, such for example, as the plug-in connectors illustrated in FIG. 3.

Figure 3:
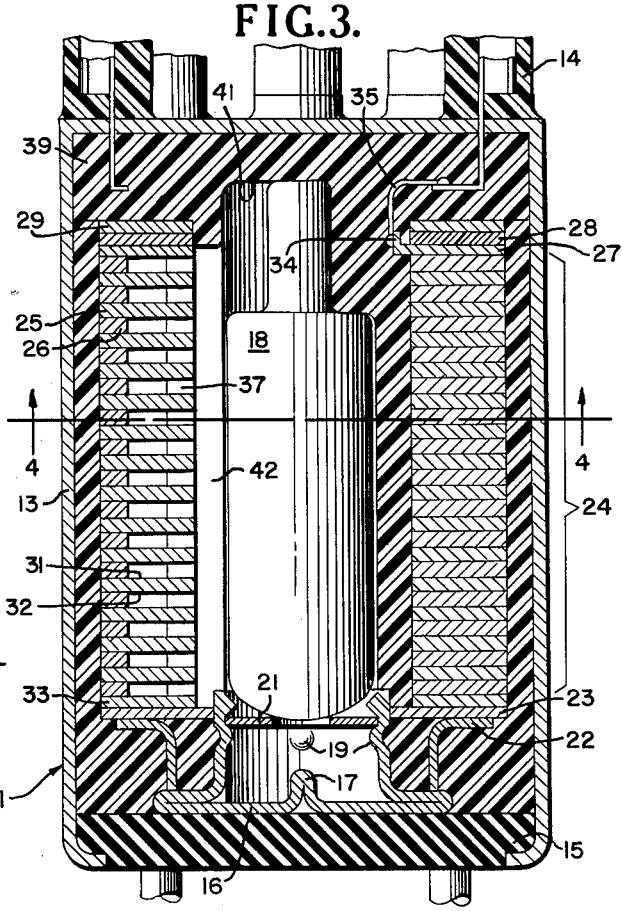
FIG. 3 is a section taken along line 3—3 of FIG. 2.

Referring now to FIG. 3, the reserve energizer 11 comprises a battery casing 13, a castellated turret 14 and a base member 15 composed of any suitable material. Supported by the base member 15 is a breaker platform 16 having an impression 17 therein and a plurality of friction contact means 19 thereon. In frictional contact with the means 19 is a suitable ampule support means, such, for example, as the disc 21 illustrated upon which is carried a frangible electrolyte containing glass ampule 18. The frictional contact between the contact means 19 and the disc 21 is sufficient to maintain the ampule 18 in the position illustrated in FIG. 3 during normal handling and shipping of the device but is, however, insufficient to maintain the ampule in this position when the projectile is fired, as will become more readily apparent as the description proceeds.

Bearing against the breaker platform 16 is a stack support 22 which abuts the cell support disc 23. Carried by the cell support disc 23 are a plurality of cells 24 comprising a plurality of annular plates 25 and a paper separator 26 interposed between each pair of plates 25. Abutting the last annular plate 27 is an insulating washer 28 of any suitable material and a stack-height adjusting washer 29. It should be understood that the height-adjusting washer may be fabricated to any desired thickness, may be omitted or a plurality of washers may be used, as the case may be, to obtain the desired stack-height.

Annular plates 25 are coated with any suitable compound over their flat surfaces which when combined with a suitable electrolyte will provide the necessary electrochemical reaction to provide energization of the battery. For example, if the cells are to be series connected the annular plates 25 may be coated over one surface thereof with lead dioxide, as at 31, and with lead on the other surface thereof, as at 32. If, on the other hand, the cells are to be parallel connected alternate plates 25 will be covered over both flat surfaces with lead dioxide and intermediate plates 25 will be coated over both surfaces thereof with lead. The alternate plates and the intermediate plates are respectively connected together and connected to the appropriate terminal means 14 to provide the output connections of the battery.

Annular plate 33 abutting the cell stack support disc 23 may be coated over the surface abutting the support disc with a coating of nickel and the breaker platform 16, the stack support 22 and the cell support disc 23 are each constructed of steel or other suitable electrical conducting material and may be plated with silver, cadium or the like, to insure good electrical contact therebetween and to the annular plate 33. Connection to this terminal of the battery may be made to any of the forementioned parts and to the appropriate terminal 14 by any suitable connecting means, as is apparent to one skilled in the art, such connection having not been shown for the sake of simplicity.

Annular plate 27 has a tab 34 thereon which is bent at a right angle to the axis of the battery to provide a suitable connection to the cells 24. Tab 34 may be connected to the appropriate terminal 14 by any suitable means such, for example, as wire 35 shown. It is to be understood, of course, that the energizer may comprise groups of series and parallel connected cells, the appropriate connections to the terminals 14 to provide a compatible energizer being apparent to one skilled in the art.

Figure 4:
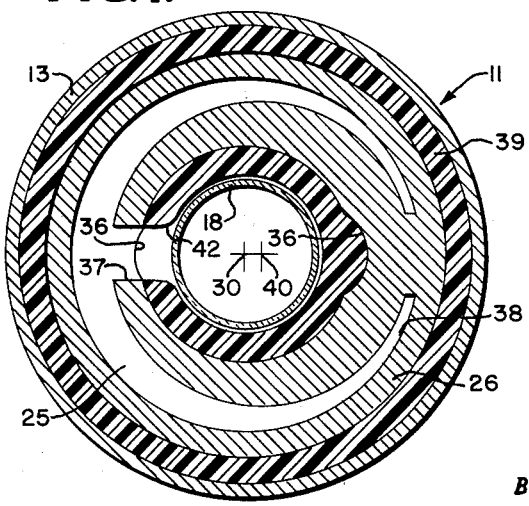
FIG. 4 is a section taken along line 4—4 of FIG. 3 and illustrates the eccentric design of the paper separator contemplated by the present invention.

The annular shaped plates 25 have a pair of diametrically spaced scallops 36 along the inner diameter thereof, as best illustrated in FIG. 4. The separator 26 has an entry-port 37 alined with one of the scallops 36 which opens into an eccentric cell channel 38. The outer edge of the cell channel 38 is an arc of a circle having its center 39 coincident with the axis of the battery while the inner edge thereof is an arc of a circle having its center 40 offset to provide the desired eccentricity. The unit is entirely incapsulated except for the ampule cavity 41 and the fill channel 42 in an elastomeric molding compound 39.

As has been hereinbefore described, the frictional contact between the contact means 19 and the ampule support disc 21 is sufficient to maintain the electrolyte containing ampule 18 in the position illustrated in FIG. 3 during normal handling and shipping of the device. When a projectile containing the energizer 11 is fired, the setback forces on the ampule 18 are sufficient to move the ampule 18 to strike the impression 17 on the breaker platform 16 with sufficient force to cause fragmentation thereof. Fragmentation of the ampule 18 releases the electrolyte contained therein which, due to the deceleration of the projectile after it leaves the muzzle of the gun, flows along the fill channel 42. The centrifugal force on the electrolyte due to the spin of the projectile forces the electrolyte through the entry-ports 37 into the cell channel 38 to activate the battery.

The current produced by each individual cell is dependent upon the area of the plate 25 wetted by the electrolyte and it is obvious that partial filling of the cell channel 38 will result in a decrease in the power output of the individual cells. The accumulation of such a decrease in power among the series connected cells may result in rendering the battery ineffective with respect to its end uses. The eccentric design of the cell channel of the present invention results in complete cell filling by the electrolyte on off-center spins of the projectile up to the eccentricity of the inner diameter. Further, as has been hereinbefore described, if the inner diameter of cell channel 38 is concentric with the outer diameter, an eccentric spin developed by the projectile after the cell is completely filled will tend to retract the electrolyte away from one surface of the inner diameter. This excess electrolyte is then forced back out of the entry-ports 37, the flow of which over the cut edge of the plate 25 at the scallop 36 shorts the individual series connected cells thereby reducing the voltage output of the unit and creating voltage transients which may render the device ineffective with respect to its end uses. The eccentric design of the channel 38 embodied by the present invention, prevents this retraction and therefore the inter-cell communication of the electrolyte upon the occurrence of off-centered spin up to the eccentricity of the inner diameter.

There has been illustrated and described an improved energizer or galvanic battery for use in a spinning projectile having a new cell channel design which insures complete filling of the individual cells with an electrolyte and prevents undesired voltage transients occurring on off-center spins of the projectile.

Obviously many modifications and variations of the present invention are possible in light of the foregoing teachings. It is, therefore, to be understood that within the scope of the appended claims, the invention may be practiced otherwise than as specifically described herein.

What is claimed as new and desired to be secured by Letters Patent of the United States is:

1. An annular insulating separator for interposition between a pair of annular plates in a force-filled spin type galvanic battery comprising an outer annular portion, an inner annular portion, a web connecting said outer annular and inner annular portions over a small area in such a manner that the spacing between said outer annular and inner annular portions is less at adjacent said web than the spacing diametrically opposite said web, said inner annular portion having an entry-port therethrough diametrically opposite said web.

2. An annular insulating separator for interposition between a pair of annular plates in a spin filled galvanic battery comprising an outer annular portion of uniform diametrical cross section in a plane perpendicular to the plane of said annular plates, an inner annular portion of non-uniform diametrical cross section in a plane perpendicular to the plane of said annular plates, a web connecting said outer annular and inner annular portions over a small area in such a manner that the spacing between said outer annular and inner annular portions is less at a point adjacent said web than the spacing diametrically opposite said web, said inner annular portion having an electrolyte entry-port therethrough diametrically opposite said web.

3. A thin annular insulating separator for interposition between a pair of plates in a spin type galvanic battery comprising an outer portion having a circular outer edge, an inner portion having a substantially circular inner edge concentric with the outer edge of said first portion, a web connecting said outer and inner portions, the inner edge of said outer portion being defined by an arc concentric with the outer edge of said outer portion, the outer edge of said inner portion being defined by a like arc eccentric with the outer edge of said outer portion whereby the spacing between said outer and inner portions is less at a point adjacent said web than the spacing diametrically opposite said web, said inner portion having an electrolyte entry port therethrough diametrically opposite said web.

4. In a reserve energizer for use as a power source in a spinning projectile, the energizer having a frangible electrolyte containing an ampule frictionally supported above a breaker platform, a plurality of chemically coated annular plates surrounding the ampule, the plates and the ampule being incapsulated in a molding compound in such a manner as to form a cavity for the ampule and a fill channel, the improvement comprising a thin insulating annular separator interposed between each pair of plates to form a plurality of cells, said separator having an arcuate channel surrounding said ampule and eccentric with respect to the outer periphery of said annular plates, said separator having an entry port therein connecting the channel in said separator to the fill channel whereby when the projectile is fired the ampule is broken against the platform to release the electrolyte and the cells are filled with electrolyte by the spin of the projectile.

5. In a galvanic battery for use as a power source in a spinning projectile, the battery having a plurality of chemically coated annular plates surrounding a frangible electrolyte containing ampule, the ampule being frictionally supported above a breaker platform, the plates and the ampule incapsulated in a molding compound in a manner to form an ampule cavity and a fill channel, a thin annular separator interposed between each pair of plates to form a plurality of cells, each of the separators comprising an outer annular portion, an inner annular portion, a web connecting said outer annular and inner annular portions over a small area, said inner annular and outer annular portions being radially spaced in a manner to form an eccentric channel therebetween, said inner annular portion having an annular opening therein surrounding said ampule and an entry-port therethrough diametrically opposite said web whereby when the projectile is fired, the ampule is broken against the breaker platform to release the electrolyte and the cells formed by said separators and the plates are filled with electrolyte by the spin of the projectile to activate the battery.

6. The battery of claim 5 wherein said outer annular portion is of substantially uniform diametrical cross section in a plane perpendicular to the plane of said annular plates and said inner annular portion is of greater diametrical cross section in a plane perpendicular to the plane of said annular plates at a point adjacent said web than the diametrical cross section in a plane perpendicular to the plane of said annular plates adjacent the entry-port therein.

7. The battery of claim 6 wherein the inner edge of said inner annular portion is circular and the outer edge of said inner annular portion is an arc eccentric with respect to said inner edge.

8. The battery of claim 7 wherein the inner edge of said outer annular portion is an arc concentric with the inner edge of said inner annular portion.

9. The battery of claim 8 wherein the inner and outer edges of said outer annular portion and the inner edge of said inner annular portion are concentric with respect to the normal spin axis of the projectile.

References Cited in the file of this patent

UNITED STATES PATENTS

| | | |
|---|---|---|
| 1,692,217 | McCarty et al. | Aug. 7, 1926 |
| 2,615,931 | Hatfield | Oct. 28, 1952 |
| 2,847,494 | Jeannin | Aug. 12, 1958 |

FOREIGN PATENTS

| | | |
|---|---|---|
| 626,319 | Canada | Aug. 29, 1961 |